C. J. WILLIAMSON.
APPARATUS FOR CLEANING EGGS.
APPLICATION FILED APR. 26, 1921.
1,392,546.
Patented Oct. 4, 1921.
2 SHEETS—SHEET 1.
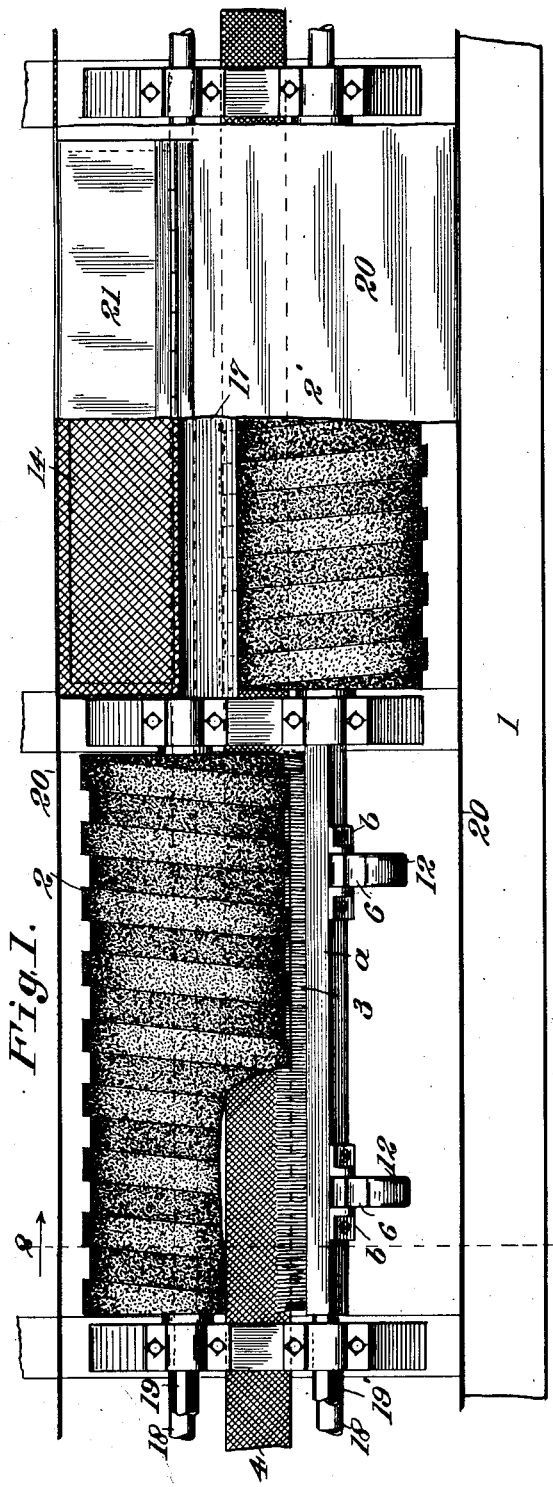
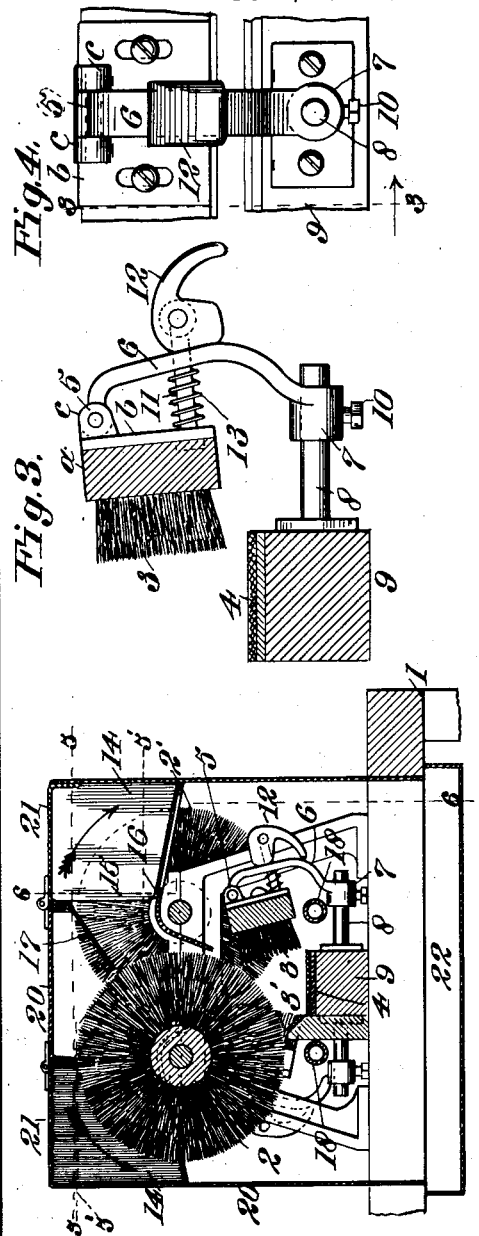
Inventor.
C. J. Williamson C. J. WILLIAMSON.
APPARATUS FOR CLEANING EGGS.
APPLICATION FILED APR. 26, 1921.
1,392,546.
Patented Oct. 4, 1921.
2 SHEETS—SHEET 2.
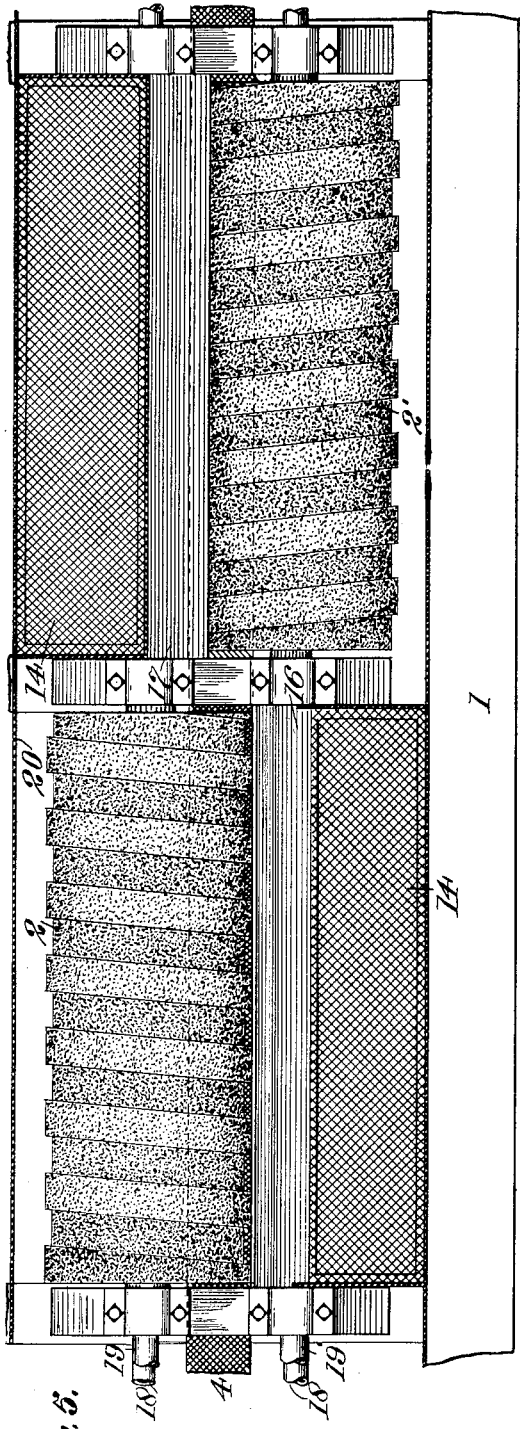
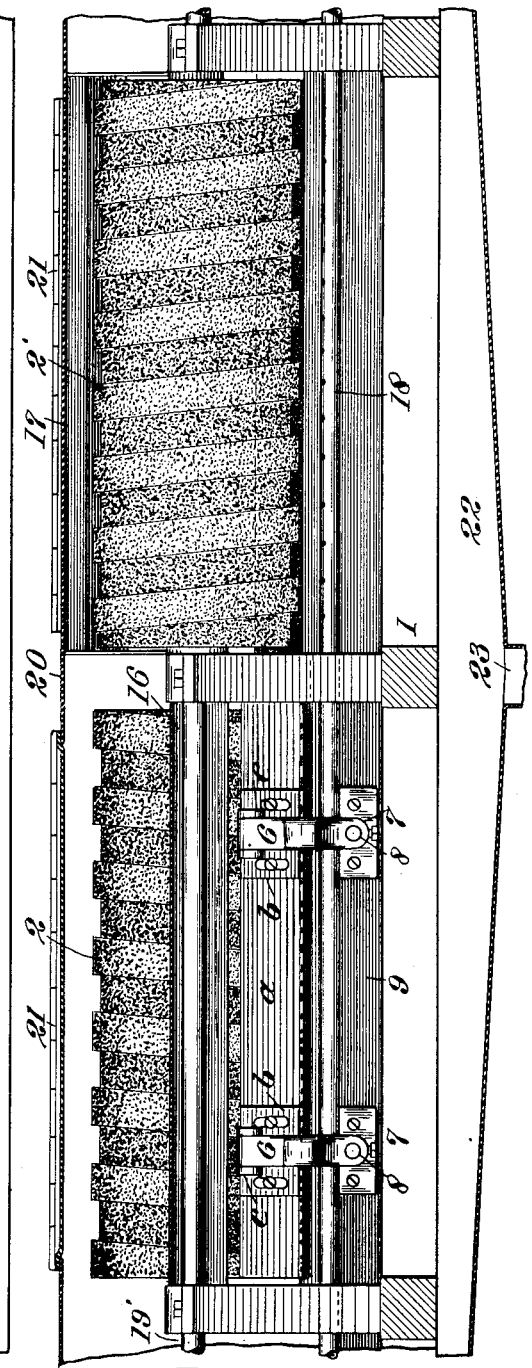

UNITED STATES PATENT OFFICE.

COLONEL J. WILLIAMSON, OF SAN FRANCISCO, CALIFORNIA, ASSIGNOR TO WILLIAMSON MACHINE COMPANY, OF SAN FRANCISCO, CALIFORNIA, A CORPORATION OF CALIFORNIA.

APPARATUS FOR CLEANING EGGS.

1,392,546.  Specification of Letters Patent.  Patented Oct. 4, 1921.

Application filed April 26, 1921. Serial No. 464,655.

*To all whom it may concern:*

Be it known that I, COLONEL J. WILLIAMSON, a citizen of the United States, residing at the city and county of San Francisco and State of California, have invented certain new and useful Improvements in Apparatus for Cleaning Eggs, of which the following is a specification.

The hereinafter described invention relates more particularly to that type of egg cleaning machine fully set forth in my pending application, Serial Number 433528, filed in the United States Patent Office under date of December 27, 1920, and to which reference is hereunto made.

In the operation of the machine disclosed in said pending application, it was found that at times the stream of eggs as advanced by the endless carrier between the fixed and rotatable brushes of the egg runway there was a tendency for the eggs to crowd one onto the other, or in other words for the stream of eggs to buckle. When this took place one or more of the eggs would climb relative to the associated forward egg of the stream and move upwardly, being lifted or raised by the rotating brush of the egg runway and gradually elevated and discharged at the side of the machine, the egg or eggs thus separated from the stream of eggs passing through the machine and discharged out of the line of travel by the rotating brush of the egg runway being broken and destroyed and thus lost for storage or processing purposes.

The object of the present invention is primarily to provide to a great extent against such loss by recovering the eggs so discharged, in other words to salvage the eggs taken from the egg stream of the apparatus disclosed in my said application Serial Number 433528.

In order to comprehend the invention, reference should be had to the accompanying sheets of drawings, wherein—

Figure 1 is a part sectional top plan view of the apparatus, certain parts thereof being broken away.

Fig. 2 is a vertical sectional view taken on the line 2—2— Fig. 1 of the drawings and viewed in the direction of the arrows.

Fig. 3 is a vertical sectional view of the egg carrier and one of the fixed brushes of the egg runway, taken on the line 3—3— Fig. 4 of the drawings, and viewed in the direction of the arrow, said view illustrating the means for adjusting the position of the fixed brush of the egg runway.

Fig. 4 is a detail side elevation of the parts disclosed by Fig. 3 of the drawings.

Fig. 5 is a horizontal sectional plan view taken on the lines 5—5, 5'—5'— Fig. 2 of the drawings, illustrating the rotary brushes of the egg runway and the pockets or containers associated therewith for receiving the eggs discharged from the machine out of their proper line of travel.

Fig. 6 is a vertical sectional view taken on the line 6—6— Fig. 2 of the drawings.

The frame 1 of the machine and the egg runway comprising two oppositely disposed parallel rotating longitudinal disposed brushes 2—2', fixed oppositely disposed brushes 3—3' one associated with each of the revolving brushes 2—2', and an endless traveling carrier 4 for receiving and advancing the eggs to be cleaned stream-wise through the apparatus, correspond with the said parts set forth in my said pending application, Serial Number 433528, and call for no detailed description herein.

In the present case, however, to the backing $a$ of the fixed or stationary brushes 3—3' are attached the plates $b$, each being provided with ears $c$ to which are pivotally mounted at 5, Figs. 3 and 4 of the drawings, the upper end of a supporting bracket 6, which said bracket at 7 is slidably mounted on a stud 8 outwardly projected from the bed 9 of the egg runway and held hereto in any desired position by means of a set screw 10. Through an opening formed in the bracket 6 extends the free end of an adjusting rod 11 secured to and extended outwardly from the plates $b$ of the fixed brushes 3—3', and to the outer end of said rod 11 is pivotally secured a cam lever 12, the cam face of which works against the outer face of the bracket 6. Said cam 12 is maintained against the face of the bracket 6 by the tension of the spring 13 surrounding the adjusting rod 11 and held between the face of the plates $b$ and the inner face of the brackets 6. In the present case there is provided two adjusting brackets 6 for each of the fixed brushes. By means of said brackets 6 and cam levers 12 two adjustments are provided for the fixed brushes, one by releasing the set screw 10 and moving the bracket 6 inwardly or outwardly relatively to the stud 8 so as to move the fixed brush toward or from the base 9 of the egg runway, and the other by throwing the cam lever 12 so as to vary the inclination of the fixed brushes relative to the horizontal face of the endless carrier 4. As the fixed brushes are suspended from a pivoted connection relative to the brackets 6 and held under the tension of the springs 13, the same will give slightly to undue pressure placed thereon, in other words vibratory movement is provided for within given limits.

With each of the revolving brushes 2—2' is associated a longitudinal disposed egg receiving pocket or trough 14, of a length corresponding to that of the brushes. The approximate depth and width of these pockets or troughs is clearly shown by Fig. 2 of the drawings, each pocket or container having its inner front wall cut away in order to provide an entrance way 15 for the passage of eggs to the interior thereof, being guided therein by the guide wall 16 and the deflector wall 17.

Rotary motion and endless travel is imparted to the brushes 2—2' and the carrier 4, respectively, by any suitable form of mechanism, such for instance as disclosed in my said pending application Serial Number 433528, and like in said application the fixed and rotary brushes are arranged in pairs alternately on one and the other side of the egg path, and the egg receiver pockets or troughs 14 are arranged alternately on one and the other side of the rotary brushes.

Associated with the fixed brushes 3—3' and extended along the pathway for the eggs are the perforated spray pipes 18, to which water under pressure is supplied for spraying the said brushes so as to wet the same and assist the action thereof in freeing the surface of the eggs of the dirt and foreign material adhering thereto.

In operation, the eggs to be cleaned are delivered onto the carrier 4 and advance thereby stream-wise through the egg runway. During the course of movement the eggs are first subjected to the action of the fixed brushes 3 and co-acting rotary brush 2, the action of the latter tending to maintain the eggs in rotation and the co-action of the brushes 2—3 is such as to remove dirt and foreign substances from the surface of the eggs which are wetted by the sprays of water playing against the fixed brushes. The continued movement of the eggs subjects the same to the action of the second set of rotary and fixed brushes 2'—3', oppositely arranged relative to the first set of brushes and which serve to remove any dirt adhering to the eggs after leaving the first set of brushes. The cleaned and washed eggs as carried from between the second set of brushes are delivered by the endless carrier 4 as cleaned eggs onto any suitable means for receiving the same for further treatment.

In case for any reason whatever the eggs as advanced stream-wise through the apparatus should crowd or jam unduly within the egg runway, the same will ride upwardly over the egg in advance thereof and move from within the stream of eggs, and such eggs will be carried upwardly by the revolving brush acting thereon at such time until brought into contact with the deflector or stripper plate 17, which will direct the egg away from the rotary brush and with the action of the guide plate or apron 16 cause the same to roll within the pocket or trough 14 situated to receive such eggs as are crowded out of the direct line of travel of the stream of eggs. Certain of such eggs so received will be cracked more or less, while others will be delivered into the pockets or troughs 14 in an undamaged condition. Such undamaged eggs are removed by the attendant of the machine and returned onto the endless egg carrier to be advanced through the apparatus for cleaning, while such of the eggs as have the shell thereof only slightly cracked or marketable for various purposes. It will thus be noted by the incorporation within the apparatus of the pockets or troughs 14 for receiving the eggs crowded or forced out of the stream of eggs, such eggs are salvaged so to speak and a material saving of the loss which heretofore resulted is created and which amounts to a considerable sum where eggs in large number are subjected daily to the action of the cleaning machine.

By adjustably mounting the fixed scrubbing brushes 3 and 3' of the egg runway, the same may be varied as to position in order to regulate the egg runway for the successful handling of eggs of varying sizes, thereby adapting the machine for the cleaning of large and small eggs.

The revolving brushes 2—2' are mounted respectively on the shafts 19—19' working in suitable bearings of the apparatus and which, as before stated, are driven by any suitable form of drive mechanism.

The working parts of the apparatus are inclosed by the housing 20, while the pockets or troughs 14 are closed by the hinged covers or doors 21.

Preferably the pockets or housings are formed of reticulated material, so that all water flowing therein from the rotary brushes will drain readily therefrom, such water and equally so the water ejected onto the fixed brushes of the egg-runway flowing downwardly into the drain pan 22 and discharging therefrom through the drain outlet 23.

While a preferred embodiment of an apparatus has been described for the carrying out of the invention, I am well aware that changes may be made in the detailed construction of the working parts herein shown and described without creating a departure from the spirit of the present invention and do not wish to be understood as restricting or confining the invention to said detailed described parts, but on the contrary wish to be understood as claiming as broadly as the state of the art will warrant the incorporating within or associating with the egg-runway mechanism means for salvaging the eggs removed or raised from within the stream of eggs as advanced through the apparatus to be cleaned, whereby a recovery of such eggs heretofore lost is made.

Having thus described the invention what is claimed and desired to be protected by Letters Patent is:—

1. An apparatus for the described purpose, the same comprising an endless longitudinally disposed carrier for receiving and advancing eggs stream-wise through the apparatus, an egg runway composed of parallel disposed rotary and fixed brushes through which the carrier works and the eggs are advanced in contact therewith, the rotary brush co-acting with the carrier and the fixed brush for imparting rotary movement to the eggs, and means associated with the egg runway for receiving such of the eggs as are crowded out of the egg-stream advanced through said runway.

2. An apparatus for the described purpose, the same comprising an egg-runway consisting of parallel disposed rotary and fixed brushes, a carrier for advancing eggs stream-wise through said runway and in contact with the surfaces of the brushes, and means associated with said runway for receiving such of the eggs as are crowded out of the stream of eggs as advanced through the egg runway.

3. An apparatus for the described purpose, the same comprising an egg-runway comprising a plurality of longitudinally disposed rotary brushes and a plurality of fixed brushes associated therewith, said brushes being arranged in pairs oppositely disposed, a carrier for advancing eggs stream-wise between and in contact with said brushes, and means associated with each pair of brushes for receiving such of the eggs moved within the runway as are crowded or lifted out of the stream of eggs as advanced through the apparatus.

4. In an apparatus for the described purpose, the combination with a longitudinally disposed endless traveling carrier adapted to receive and advance eggs to be cleaned stream-wise through the apparatus, cleaning mechanism associated with said carrier for contacting with the eggs and cleaning the surface thereof as advanced through the apparatus, and means adapted to receive such of the eggs as are crowded out of the moving stream of eggs.

5. In an apparatus for the described purpose, the combination with a carrier adapted to receive eggs to be cleaned and advancing the same stream-wise through the apparatus, parallel disposed rotary and fixed brushes between and in contact with which the eggs to be cleaned are advanced, a longitudinally disposed pocket associated with the revolving brush for receiving such of the eggs as are crowded out of the stream of eggs as advanced between the brushes, and means for directing the eggs into said pocket.

6. In an apparatus for the described purpose, a runway composed of a plurality of pairs of oppositely disposed parallel rotary and fixed brushes, means for receiving and advancing eggs stream-wise between and in contact with said brushes, means for supplying water to the brushes, and a longitudinally disposed pocket associated with each of the rotary brushes for receiving such of the eggs as are crowded and lifted out of the stream of eggs as advanced through the apparatus.

7. The combination with the cleaning brushes of an egg runway, a carrier for receiving and advancing eggs stream-wise therethrough, and means associated with the runway for receiving and recovering such of the eggs as are lifted out of the stream of eggs as advanced through the runway.

8. An apparatus for the described purpose, the same comprising an egg runway composed of a longitudinally disposed rotary cleaning brush and a fixed laterally adjustable brush arranged parallel therewith, a carrier for receiving and advancing eggs stream-wise between and in contact with said brushes, means for varying the position of the adjustable brush to adapt the egg runway for the handling of eggs of varying sizes, and a pocket associated with the rotary brush of the runway adapted to receive such of the eggs as are crowded out of the stream of eggs as advanced through the apparatus.

9. An apparatus for the described purpose, the same comprising an egg runway consisting of a plurality of rotary longitudinally disposed rotary brushes and a plurality of fixed adjustable brushes associated therewith, said brushes being arranged in pairs oppositely disposed, a carrier for receiving and advancing eggs stream-wise between and in contact with said brushes, means for supplying water to the brushes, means associated with the brushes of the runway for receiving such of the eggs as are crowded from the egg stream as advanced through the egg runway, and devices for adjusting the fixed brushes to vary the egg runway in accordance with the size of the eggs to be passed therethrough.

10. An apparatus for the described purpose, the same comprising a runway consisting of two parallel members adapted to engage and clean the surface of eggs, a carrier for receiving and advancing eggs streamwise through said runway, and means associated with the runway adapted to receive and retain such of the eggs as are crowded out of the stream of eggs as advanced through said runway.

11. An apparatus for the described purpose, the same comprising a runway consisting of two parallel members adapted to engage and clean the surface of eggs, a carrier for receiving and advancing eggs stream-wise through said runway, means associated with the runway adapted to receive and retain such of the eggs as are crowded out of the stream of eggs as advanced through said runway, and devices for adjusting the position of one member of the runway to vary the same in accordance with the size of the eggs to be treated.

In testimony whereof I have signed my name to this specification.

COLONEL J. WILLIAMSON.